Sept. 30, 1969   W. L. JOHNSON   3,469,958
DIMENSIONALLY STABLE FLEXIBLE ABRASIVE SHEET MATERIAL
Filed Dec. 5, 1966
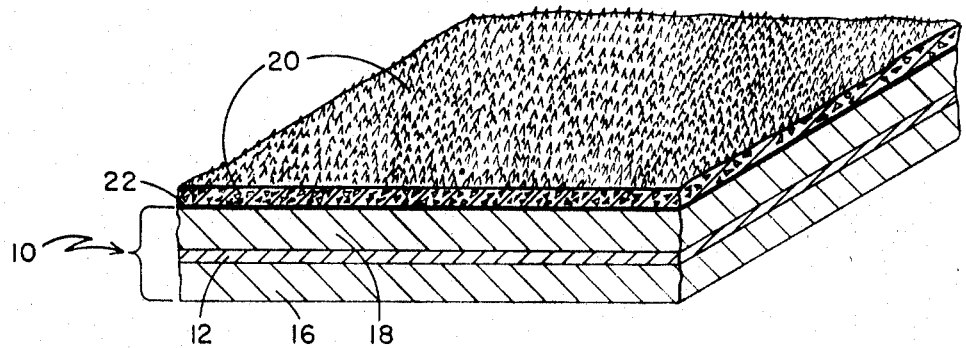

United States Patent Office 3,469,958
Patented Sept. 30, 1969

3,469,958
DIMENSIONALLY STABLE FLEXIBLE ABRASIVE SHEET MATERIAL
William L. Johnson, Hanover, Mass., assignor to Abrasive Products, Inc., South Braintree, Mass., a corporation of Massachusetts
Filed Dec. 5, 1966, Ser. No. 599,248
Int. Cl. B24d 11/02
U.S. Cl. 51—297           5 Claims

ABSTRACT OF THE DISCLOSURE

A dimensionally stable flexible abrasive sheet comprising a laminated backing formed of a malleable metallic foil layer between thicker layers of paper, and a layer of abrasive grit adhesively secured to a surface of said laminated backing.

---

This invention relates to abrasive sheet material and more particularly to flexible coated abrasive sheet materials having novel backings, providing extraordinary dimensional stability together with other improved characteristics.

While paper continues to be used in large volume as a practical backing for coated abrasive materials which utilize aqueous applied making coats for adhering abrasive grit, particularly when four or five ply cylinder paper is used to provide backing strengths in the range of 130 pounds to 150 pounds (tensile per inch of width in the machine direction), abrasive manufacturers are constantly confronted with the hygroscopic nature of paper fibers and their inherent lack of wet strength, which characteristics create various problems both during manufacture, during subsequent storage and in use because of stretching, distortion, edge tearing, etc., as generally outlined in U.S. Patent No. 3,135,590.

The industry has had some success in meeting problems of this nature by resorting to the use of high strength high density cylinder papers and by treating the papers with various rubber or resinous materials. In attempting, however, to impart better dimensional stability by introduction of moisture resistant materials either in impregnant or layer form, other disadvantages were encountered by reason of thermosensitivity of the introduced material. If the material was thermoplastic, for ease of application, it led to undue softening of the material by localized heat generated during the abrading operation, resulting in delamination of the composite material; or with the use of thermosetting materials, undue embrittlement occurred either during curing or storage or as a result of the operational heat.

The aforesaid patent suggested the substitution of glass fibers for part of the cellulose fibers in the paper backing, thus losing to that extent the desirable qualities of a cellulose fiber backing.

The present invention provides a quite different solution for overcoming the disadvantages of dimensional instability in abrasive coated fibrous backing composites having water laid adhesives with abrasive grit adherent thereto, while providing certain advantages not procured with the use of organic impregnants or by partial substitution of inorganic fibers.

A prime object of the present invention is to provide a flexible abrasive coated material having dimensional stability that is even more effective and certainly much simpler than that heretofore proposed.

The above and other objects of the invention are accomplished by utilizing as the backing a laminate having as an internal ply an inorganic foil such for example as aluminum foil sandwiched between other plies of paper. Although the ply of metal foil is a more expensive ply than a ply of cellulose fiber, I have found the additional expense can be partially recovered because the metal foil provides such a complete barrier to transmission of moisture during application of aqueous-laid adhesives. Thus, since the aqueous medium cannot pass through the foil layer, the paper on the back side of the backing need no longer be as resistant to moisture penetration as before since it remains completely dry during the coating operation. Hence, instead of using cylinder paper as has heretofore been required to maintain adequate strength and resistance to adhesive penetration, when the foil is present, a substantial proportion or all of the paper may now consist of Fourdrinier stock, the foil lamination more than making up for any loss in tensile strength by the substitution of the Fourdrinier for cylinder paper.

In addition to acting as a moisture barrier, the foil also, being heat conductive, acts as a heat sink to dissipate heat accumulating in localized areas of the abrasive material during an abrading operation.

Lastly, the foil, which usually is malleable, imparts a salutary non-creasing characteristic to the whole backing which is useful during handling, spreading, cutting and jointing and while the sheets are being mounted on drum or belt machines.

A typical example of the invention is shown in the accompanying drawing wherein a backing material 10 comprises a thin layer of metal foil 12 sandwiched between a thicker one heavy ply Fourdrinier paper 16 on the print side of the foil and two plies 18, similarly thicker, of cylinder paper on the grit side of the foil, and the surface of the latter paper plies carry abrasive grit 20 secured thereto by an intervening coat of aqueous laid adhesive 22 such as animal hide or casein glue.

The following are given as typical examples of procedure for manufacturing the product of this invention:

EXAMPLE I

A 70 pound (ream weight) Fourdrinier kraft one-ply paper having a tensile strength of 63 pounds in the machine direction and 27 pounds in the cross direction was laminated to one side of a one-half mil aluminum foil sheet having a tensile strength of 5.5 pounds; while a 70 pound two-ply cylinder kraft paper having a tensile of 81 pounds in the machine direction and 28 pounds in the cross direction was laminated to the other side of the foil. The laminating adhesive was a casein adhesive of the type described in U.S. Patent No. 2,754,240.

All tensile measurements were made in accordance with Federal Specification UU–P–31b Method 171 using 1″ x 6″ strips.

The resulting plied laminate had the following tensile characteristics:
  178# in the machine direction;
  68# in the cross direction.

The sheet was processed in conventional abrasive coating machinery utilizing as an adhesive for the grit a conventional aqueous dispersed adhesive which after spreading on the cylinder side of the paper was coated with grit and subsequently festooned and dried to drive off the moisture.

EXAMPLE II

The same procedure was followed except that instead of the one-half mil aluminum foil, a foil of approximately ⅓ mil was used having a tensile strength of 3.9 pounds.

The resulting plied laminate had the following tensile characteristics:
  174# in the machine direction;
  65# in the cross direction.

Other weights of papers may be used although those in the 60 pound to 70 pound range are preferable. The composite backing should, however, have a tensile strength exceeding 150 pounds in the machine direction and 55 pounds in the cross direction. For some usages, Fourdrinier paper may be used on both faces of the foil which in turn may be of any suitable flexible metal including copper or steel or their alloys.

What is claimed is:

1. Dimensionally stable flexible abrasive sheet material comprising a composite backing material formed of a thin malleable metallic foil layer adhesively laminated between thicker layers of paper, said composite backing having a tensile strength of upwards of 150 pounds in the machine direction of the paper and upwards of 55 pounds in the cross direction, and a layer of abrasive grit secured to a surface of said composite backing with an intervening layer of an aqueous laid adhesive selected from the group consisting of animal hide and casein.

2. Abrasive sheet material as claimed in claim 1, wherein the paper on at least one side of said foil is Fourdrinier paper, and the layer of abrasive grit is adhesively secured to the other side of said composite backing.

3. Abrasive sheet material as claimed in claim 2, wherein the paper on the other side of said foil is multiply cylinder paper.

4. Abrasive sheet material as claimed in claim 1, wherein the metallic foil is aluminum foil.

5. Abrasive sheet material as claimed in claim 1, wherein the metallic foil is steel foil.

References Cited
UNITED STATES PATENTS

| | | | |
|---|---|---|---|
| 2,187,743 | 1/1940 | Kirchner | 51—298.1 |
| 2,627,145 | 2/1953 | Frigstad | 51—298.1 |
| 3,214,253 | 10/1965 | McCord | 51—298.1 |

DONALD J. ARNOLD, Primary Examiner

U.S. Cl. X.R.

51—298.1, 301